May 24, 1966   D. P. HINGS   3,253,071
METHOD OF MAKING A GOLF CLUB
Original Filed March 14, 1960   2 Sheets-Sheet 1

INVENTOR.
DONALD P. HINGS
BY
Woodling Krost Granger Rust
attys.

May 24, 1966  D. P. HINGS  3,253,071
METHOD OF MAKING A GOLF CLUB
Original Filed March 14, 1960  2 Sheets-Sheet 2
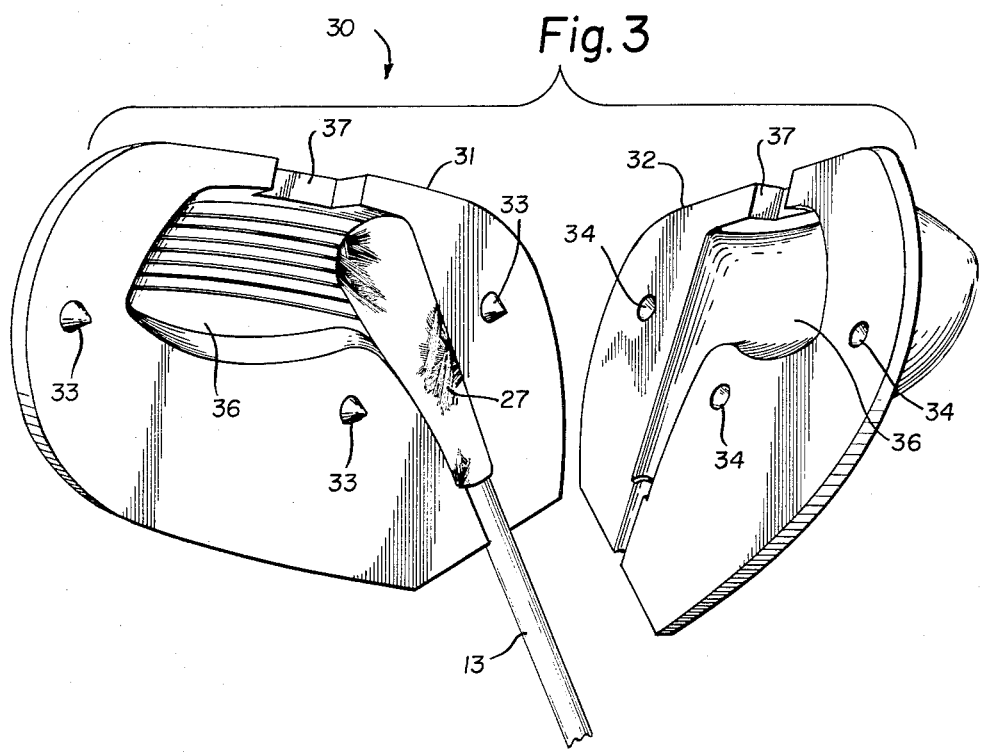
INVENTOR.
DONALD P. HINGS
BY
Woodling Krost Granger & Rust
Attys.

United States Patent Office 3,253,071
Patented May 24, 1966

3,253,071
METHOD OF MAKING A GOLF CLUB
Donald P. Hings, 280 N. Howard Ave., North Burnaby, British Columbia, Canada
Original application Mar. 14, 1960, Ser. No. 14,591. Divided and this application May 26, 1964, Ser. No. 370,261
6 Claims. (Cl. 264—129)

This application is a division of Serial Number 14,591, filed March 14, 1960 for Epoxy Resin Golf Head Integral Cured with a Shaft Wrapping of Glass Fiber Material.

The invention relates in general to a new and novel golf club construction and to the method of making the golf club.

An object of the invention is to provide a golf club having a reinforced shaft section where the shaft joins the club head.

Another object of the invention is to provide a golf club head which comprises an epoxy resin combination along with glass fibers and a filler.

Another object of the invention is to provide a golf club head which comprises a thermosetting resin joined to the golf club shaft by means of a glass fiber covering on the end of the shaft and intimately engaging the thermosetting resin.

Another object of the invention is to provide a golf club which is highly shock resistant as well as durable and which has a very ornamental appearance.

Another object of the invention is to provide a method of making a golf club which includes wrapping the end portion of a shaft with a glass fiber covering and then inserting the same into a mold and forming the club head thereabout by introducing a mixture of a resin, glass fibers and filler into the mold, removing the club head and shaft end portion from the mold and applying a colored or clear resin coating for the club head.

Other objects and a clearer understanding of my invention may be had by referring to the following specification and claims, taken in conjunction with the accompanying drawing, in which:

FIGURE 3 is a disassembled view of a mold, with a glass fiber wrapped shaft in place therein, which is used to produce the golf club of the present invention.

Figure 1:
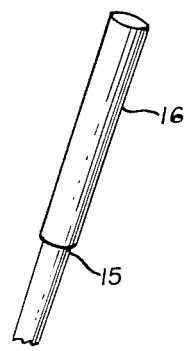
FIGURE 1 is a perspective view of the finished golf club of the present invention.
Figure 2:
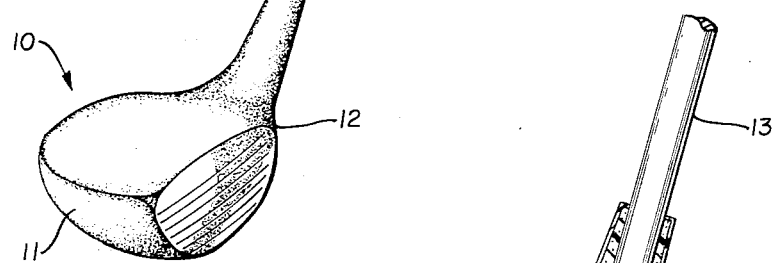
FIGURE 2 is an enlarged sectional view taken through the club head shown in FIGURE 1.
Figure 2:
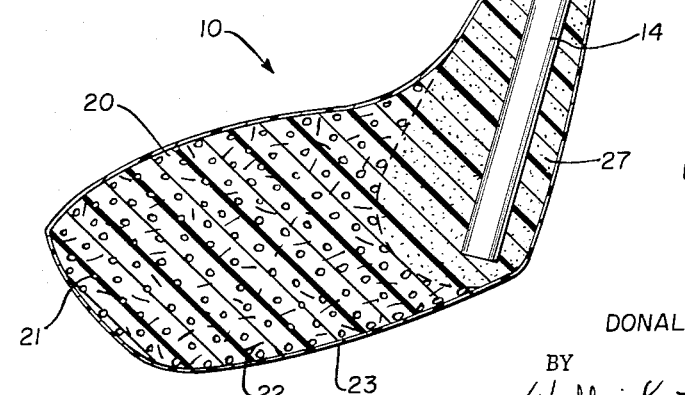

The golf club of the present invention is best seen in FIGURES 1 and 2 of the drawings and includes generally a head 10 having toe and heel portions 11 and 12 respectively. A shaft 13 is secured at a first or lower end portion 14 thereof to the head 10 and at a second or upper end portion 15 thereof is provided with a head grip 16.

The golf club head 10 comprises an epoxy resin 20 which has been cured to a hard state and which has intermixed therein a filler 21 which in this instance is expanded mica, and milled glass fibers 22. A coating 23 is applied to the club head 10 and this coating comprises an epoxy resin similar and/or the same as the epoxy resin 20 which makes the club head proper. This coating may or may not have included therein various pigments to provide color and give a decorative appearance to the golf club head. Although not specifically shown herein it will be clear to those skilled in the art that additional coatings of either colored or clear epoxy resin may be applied to the coating 23.

The club head proper is connected to the shaft 13 by way of glass fiber 27 being wrapped around the lower end portion 14 which glass fiber has been saturated with an epoxy resin which may be of the same formulation as that of the epoxy resin 20 used in the club head proper. The glass fiber which is wrapped around the end portion 14 of the shaft is what is commonly referred to as "continuous roving." This "continuous roving" comprises a plurality of continuously extending glass fibers which are of indefinite length and which are not interwoven with each other. It will be appreciated however by those skilled in the art that the continuous fibers may be physically interwoven or otherwise secured to each other without departing from the spirit and scope of the present invention. The continuous roving which is applied around the end portion 14 of the shaft 13 is preferably saturated with the epoxy resin before being applied thereto. However, if desired the resin may be applied after the material is applied around the shaft and the claims should be construed at least broadly enough to cover these slight variations. The milled glass fibers 22 are made up essentially of short lengths of finely chopped "continuous roving." The shaft 13 may be constructed of metal or may be of glass fiber. This construction with the end portion of the shaft having the glass fiber applied thereto saturated with epoxy resin gives an excellent reinforced connection between the shaft and club head.

The method of constructing the golf club of the present invention can best be understood by referring to FIGURE 3 of the drawings. The end portion 14 of the shaft 13 is wrapped with the continuous roving glass fiber 27 described hereinabove which has been saturated with an apoxy resin formulation which will be further described hereinafter. The end portion 14 is then placed in a split mold 30 as shown in FIGURE 3. The split mold 30 includes first and second parts 31 and 32 respectively. Mold part 31 has a plurality of male members 33 adapted to fit into a plurality of female members 34 on mold part 32 to properly align the two members in their assembled condition. The split mold is made with a cavity 36 formed into the shape of the finished club head. After the mold parts 31 and 32 are closed, a mixture of epoxy resin, milled glass fibers and expanded mica is introduced into the mold cavity 36 through an opening 37. The formation utilized is as follows:

| | Parts |
|---|---|
| Epoxy resin (A) | 50 |
| Polyamide resin | 50 |
| Expanded mica | 5 |
| Milled glass fiber | 5 |

The glass fibers 27 were impregnated prior to this step with the above formulation with the exception that the mica and milled glass fibers were omitted. The club head is then hardened by the use of heat if desired and is then removed from the mold 30 and any flashing which remains on the club head is removed for example by grinding.

After this has been accomplished the color coating 23 is applied as well as a metal base plate (not shown) if necessary and desired. The formulation for the coating 23 is the same as for impregnating the glass fibers 27 but with a pigment added. The amount of pigment used varies considerably on the color desired and the pigment itself. The following are three pigments used and the amounts:

| | |
|---|---|
| Lamp black | 1 part per 100 |
| Manganese blue | 6 parts per 100 |
| Ferris oxide | 10 parts per 100 |

This color coat 23 is applied either by spraying or dipping and immediately after applied, the club head is rotated slowly to eliminate flaws in the finish and the coat is hardened. This hardening process may be accelerated by the use of temperatures of from 70 degrees to 600 degrees F.

After the coating 23 has been applied additional coatings (clear or colored) may be applied. The color may be applied to the club head by covering the mold with the color prior to the casting step which, if done, does away with the necessity of adding pigment to the coating 23. It is also possible to achieve many decorative effects by wiping another color epoxy resin over cut impressions in the finished club surface, such as the facing lines, trademarks and so forth.

Another epoxy formulation usable in the golf club may be as follows:

| | Parts |
|---|---|
| Epoxy resin (A) | 30 |
| Epoxy resin (B) | 70 |
| N-aminoethylpiperazine | 16 |
| Expanded mica | 5 |
| Milled glass fibers | 5 | or

| | |
|---|---|
| Epoxy resin (B) | 75 |
| N-aminoethylpiperazine | 15 |
| Expanded mica | 5 |
| Milled glass fibers | 5 |

The epoxy resin formulations usable in the practice of the present invention may vary within limits to obtain certain qualities in the finished golf club. All of the epoxy resin usable in the practice of the present invention possess terminal epoxide groups; hence, the name epoxy. The primary difference among the various types of epoxy resins is in the molecular weight. The physical characteristics of the Epoxy Resin (A) referred to above is that it is a liquid by the Durrans Mercury method, has a Gardner Color at 25° C. of 8 max., a viscosity of 40–100 poises at 25° C., and an epoxide equivalent (grams of resin containing one gram equivalent of epoxide) of from 180–195. The physical characteristics of Epoxy Resin (B) is a viscosity at 25° C. of 750–800 cps., a Gardner Color of 10–11 and an epoxide equivalent of 320–345.

The polyamide resin used in the first formulation given hereinabove is prepared basically by the condensation reaction of polymerized linoleic acid with polyamines. These polyamide resins are included in a large family from hard, brittle, relatively inert materials to reactive, pourable fluids. The characteristics of the polyamide resin used herein is as follows: An amine value of 290–320, a Gardner Color (solid resin) of NDT 12, melting point (ASTM 1240) of fluid, a Brookfield viscosity in poises at 40° C.—#6 Spindle—4 r.p.m. of 80–120 and a specific gravity of 0.97. It will be appreciated by those skilled in the art that the amines are used primarily to aid in curing the epoxy resin. The epoxy resin may also be homopolymerized with the aid of catalysts as well as copolymerized with the amines. The expanded mica filler accomplishes the primary function of adjusting the golf club weight and may be modified to various degrees. For the purpose of appropriately claiming the invention the material which is added to the epoxy resin to facilitate the curing of the same may be referred to as a curing agent.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The method of making a golf club comprising the steps of wrapping the end portion of a shaft with a glass fiber covering which covering is saturated with an epoxy resin, placing said wrapped end portion of said shaft into a split mold which split mold is in the form of a golf club head, introducing into said split mold an epoxy resin mixed with milled glass fibers and an expanded mica filler, curing said epoxy resin mixture, removing the formed golf club head and end portion of said shaft from said mold, removing any flashing from said golf club, applying a color coating to said golf club head which comprises a pigment intermixed with an epoxy resin, and curing said color coating.

2. The method of making a golf club comprising the steps of wrapping the end portion of a shaft with a glass fiber covering which covering is saturated with an epoxy resin, placing said wrapped end portion of said shaft into a mold which mold is in the form of a golf club head, introducing into said mold an epoxy resin mixed with glass fibers and a filler, curing said epoxy resin mixture, removing the formed golf club head and end portion of said shaft from said mold, and applying a final coating to said golf club head which comprises a thin layer of an epoxy resin.

3. The method of making a golf club comprising the steps of applying glass fiber which has been saturated with an epoxy resin and curing agent to an end portion of a shaft, placing said end portion of said shaft and said glass fiber thereon into a mold designed in the shape of a golf club head, introducing an epoxy resin and curing agent mixed with milled glass fibers and an expanded mica filler into said mold to form said golf club head integral with said end portion of said shaft, curing said resin mixture, removing said formed golf club head from said mold and applying a coating thereto which comprises an epoxy resin and curing agent.

4. The method of making a golf club comprising the steps of applying glass fiber saturated with an epoxy resin to an end portion of a shaft, placing said end portion of said shaft and said glass fiber thereon into a mold designed in the shape of a golf club head, introducing an epoxy resin mixed with milled glass fibers and a filler into said mold to form said golf club head integral with said end portion of said shaft, curing said resin mixture and removing said formed golf club head from said mold.

5. The method of making a golf club comprising the steps of wrapping the end portion of a shaft with a glass fiber covering with the wrapped covering producing a larger diameter at the extreme end of the said end portion of the shaft than at a position more toward the other end of the shaft and with the covering being saturated with a resin, placing said wrapped end portion of said shaft into a mold which mold is in the form of a golf club head, introducing into said mold a resin mixed with milled glass fibers and a filler, curing said resin mixture, removing the formed golf club head and end portion of said shaft from said mold, and removing any flashing from said golf club head.

6. The method of making a golf club comprising the steps of wrapping the end portion of a shaft with a glass fiber covering which covering is saturated with a resin, placing said wrapped end portion of said shaft into a mold which mold is in the form of a golf club head, introducing into said mold, a resin, curing said resin and wrapped end portion of said shaft into an integral unit, and removing the formed golf club head and end portion of said shaft from said mold.

References Cited by the Examiner

UNITED STATES PATENTS

| 1,501,344 | 7/1924 | Hubbard | 175—422 |
| 1,907,303 | 5/1933 | Peterson | 264—274 XR |
| 2,020,679 | 11/1935 | Fitzpatrick | 273—80.4 |
| 2,021,425 | 11/1935 | Nielsen | 4—236 |
| 2,534,947 | 12/1950 | Bright | 264—274 XR |
| 2,594,838 | 4/1952 | Alexander et al. | 138—174 |
| 2,991,080 | 7/1961 | Redmond | 273—80 |

ROBERT F. WHITE, *Primary Examiner.*

M. R. DOWLING, *Assistant Examiner.*